Aug. 28, 1945.   J. J. SCHUMACHER   2,383,745
CONTAINER-DRUM
Filed Feb. 15, 1943   3 Sheets-Sheet 1

JOHN J. SCHUMACHER,
INVENTOR.

BY Joseph F. Westall
ATTORNEY.

Aug. 28, 1945.  J. J. SCHUMACHER  2,383,745
CONTAINER-DRUM
Filed Feb. 15, 1943  3 Sheets-Sheet 2
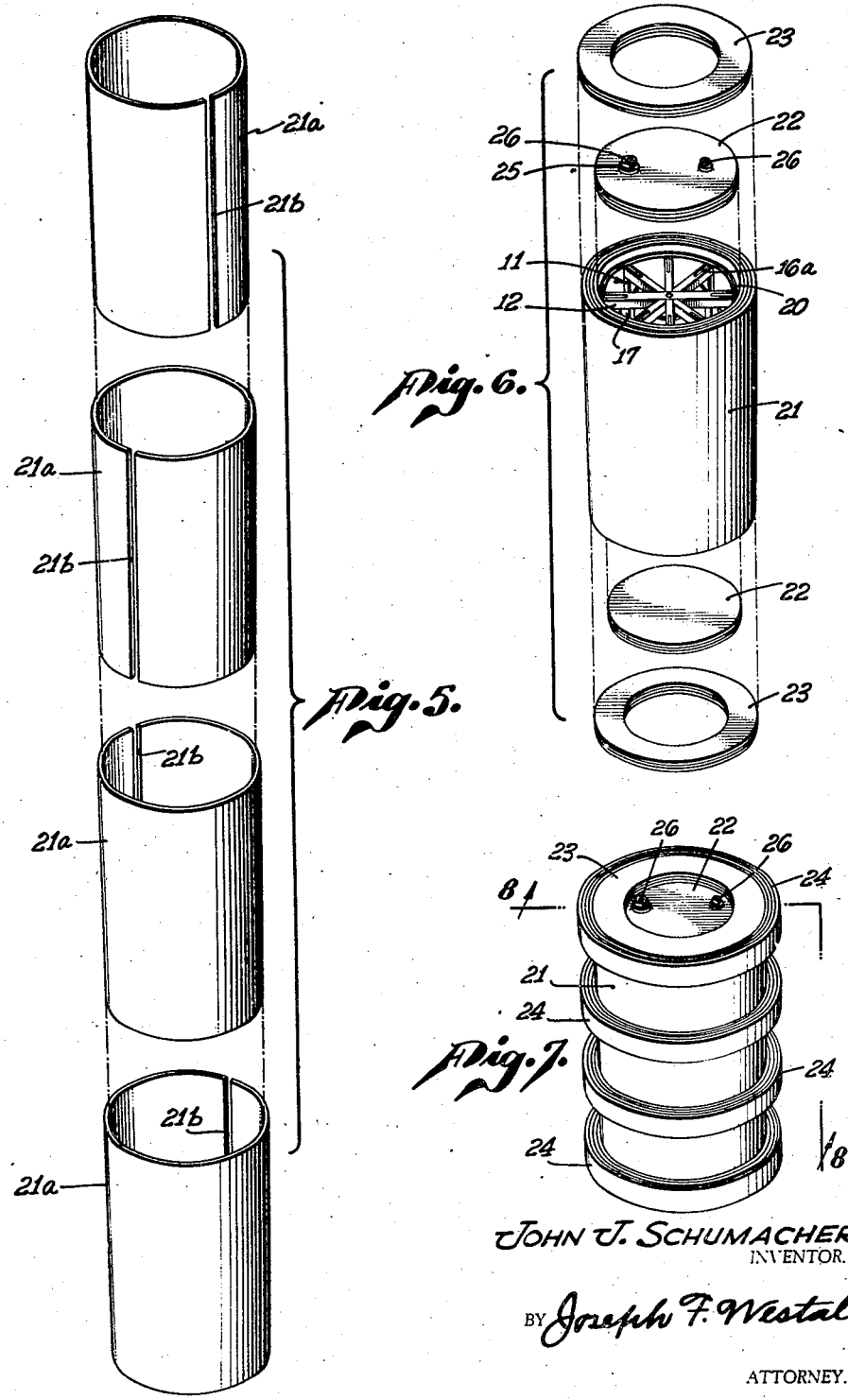

Aug. 28, 1945.    J. J. SCHUMACHER    2,383,745
CONTAINER-DRUM
Filed Feb. 15, 1943    3 Sheets-Sheet 3
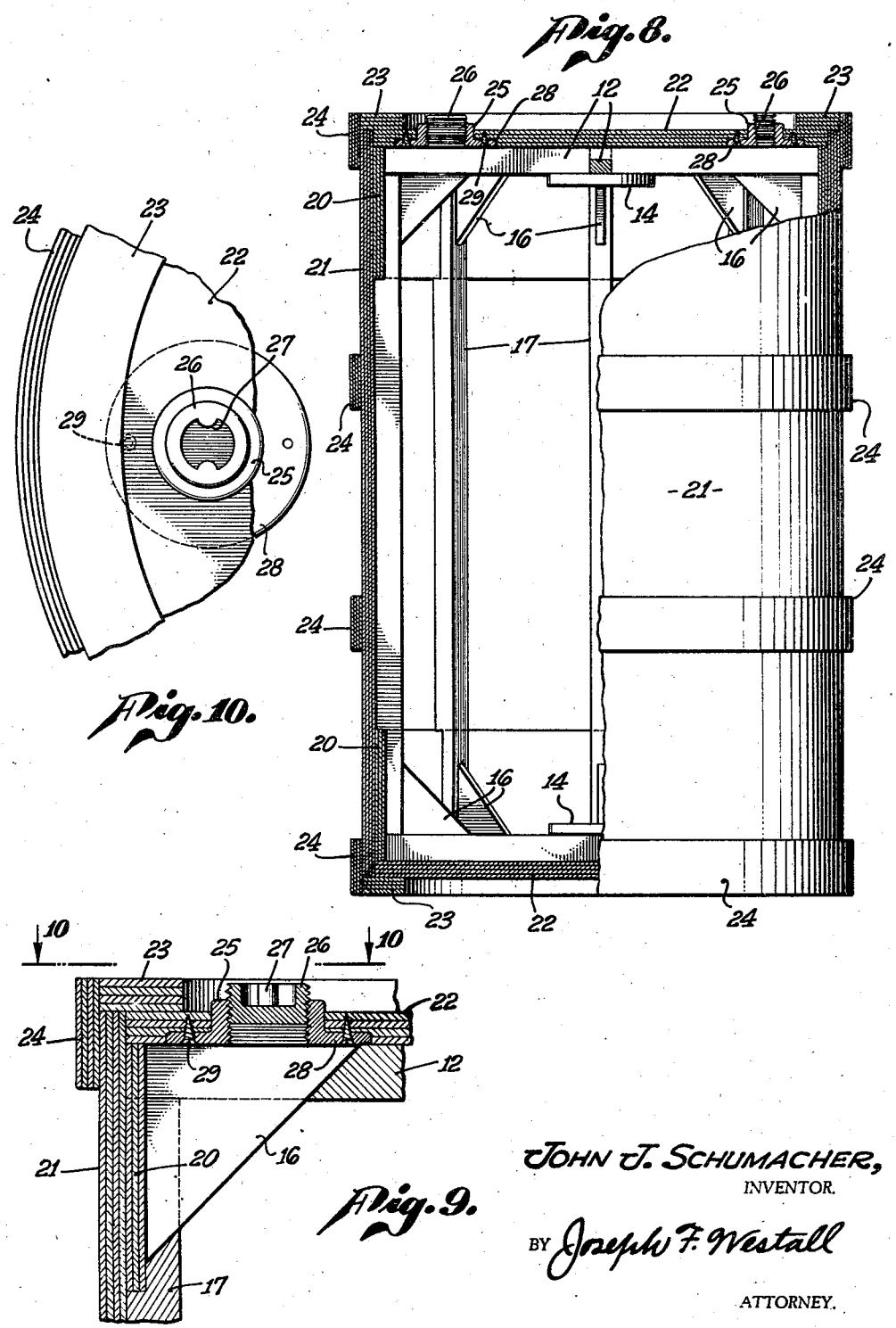
JOHN J. SCHUMACHER,
INVENTOR.
BY Joseph F. Westall
ATTORNEY.

Patented Aug. 28, 1945

2,383,745

UNITED STATES PATENT OFFICE 2,383,745

CONTAINER-DRUM

John J. Schumacher, Encino, Calif.

Application February 15, 1943, Serial No. 475,862

6 Claims. (Cl. 217—72)

This invention relates to a drum constructed principally of wood, to be employed as substitutes for the steel drums heretofore commonly used for storage and transportation of various products— fluid, solid and semi-solid, of all kinds, including crystalline and powdered materials.

It is a general object of the present invention to provide a drum largely of wood, and with a minimum of metal parts; but which is sufficiently rugged and resistant to rough handling to withstand all tests and to comply with all applicable rules and requirements of the Interstate Commerce Commission and of the Consolidated Freight Classification Committee, at present applying to steel drums for like purposes, thus to conserve steel, which at the present time is so urgently needed for vital war purposes.

Another important purpose is to provide a drum of sufficient durability to be repeatedly filled, transported, emptied, returned, refilled and reshipped; and which will stand the repetitious handling incident to such returnable service.

To achieve the greatest economy of material in the construction of the shell of the drum and its closing heads, it is an important object of my invention to provide an interior supporting frame which will adequately bear and safely distribute the severe stresses and strains incident to handling and usage.

In furtherance of the general purposes above outlined, it is a particular aim to provide a plurality of overlapping seams at what is known in steel drum constructions as the chimes (being head to shell connections) and to adequately reinforce such joints to provide maximum security against handling injuries which might result in leakage.

Another object is to provide a deep-crowned drum head for protection of protruding orifice plugs, said head being enclosed by annular plywood reinforcements which latter present an extended level standing surface for supporting the drum in upright position.

Provision of rolling hoops of laminated wood construction which perform the double function of facilitating moving of the drum and of contributing great sturdiness to the cylindrical shell, chimes, and deep crowned head is still another important object.

Another and vital purpose of said invention is economy of bulk and weight—to the maximum extent permitted by materials employed (with requirements of ruggedness and incident durability always in view)—thus to facilitate handling and to conserve its incident expense as well as to economize space in shipping and storage and the costs thereof.

Other objects and corresponding advantages, such as comparatively low cost of manufacture, resulting from, among other things, the feasibility of employment of simple wood working apparatus, tools and equipment in fabrication and assemblage, and to the use of inexpensive materials, will be apparent to those of skill in the art upon an examination of the following description read in the light of the accompanying drawings in which.

Fig. 5 embraces perspective views of four of the wooden laminations which, compressed together with a suitable adhesive intervening, form the cylindrical shell of the drum; this figure also showing how adjoining ends of each of the laminations are disposed on final assemblage with respect to each of the others;

Fig. 6 is a perspective assembly view illustrating disposition, relative to others, of each principal part of the drum (except of the laminated wooden rolling hoops which in this figure are omitted);

Fig. 7 is a perspective view of the completed drum, and indicating the structure and relative arrangement encircling the shell of the rolling hoops of laminated wood.

Fig. 8 is a view, partly in section and partly in broken away elevation, illustrating details of assemblage and joinder of principal parts, particularly of the chimes;

Fig. 9 is an enlarged broken away section adjacent the point of joinder of a radial member and a longitudinal member of the frame, showing the construction of the chimes (top and bottom) and illustrating also details and mounting of screw threaded orifice fittings and their plugs;

Fig. 10 is a partial plan view looking from line 10—10 of Fig. 9 in the direction of the arrows.

Figure 3:
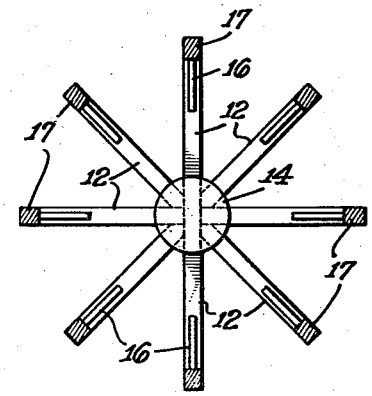
Fig. 3 is a view of the lower (as placed in the drawings) radial members of the frame and their corner braces on the line 3—3 of Fig. 2, showing longitudinal members of the frame in section.

Referring to the drawings in detail, the numerals of which identify similar parts throughout the several views, 11 indicates a frame (best generally illustrated in Figs. 2 and 4) for interiorly supporting and reinforcing the container body of the drum. Frame 11, for each of its ends, comprises an assemblage (Figs. 1 and 3) of diametrically disposed members; and for the sides connecting said end assemblages embraces a plurality of longitudinal members later to be specifically described.

Each of said diametrically disposed members of frame 11 are identical in details of structure, and are also counterparts as to joinder, as hereinafter described, with longitudinal members of said frame 11; so that the same identifying numerals are applicable to frame structural elements of both ends.

Figure 1:
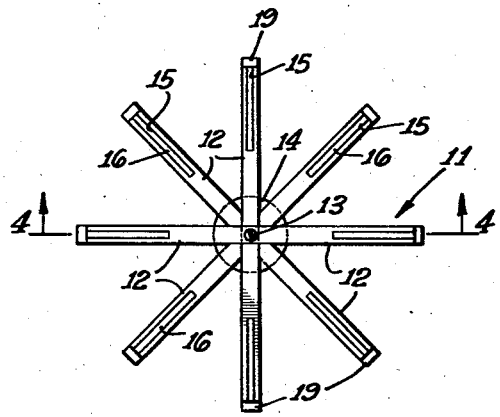
Fig. 1 is a plan view of radial members (top or bottom) of the interior frame to support the container body of the drum.
Figure 2:
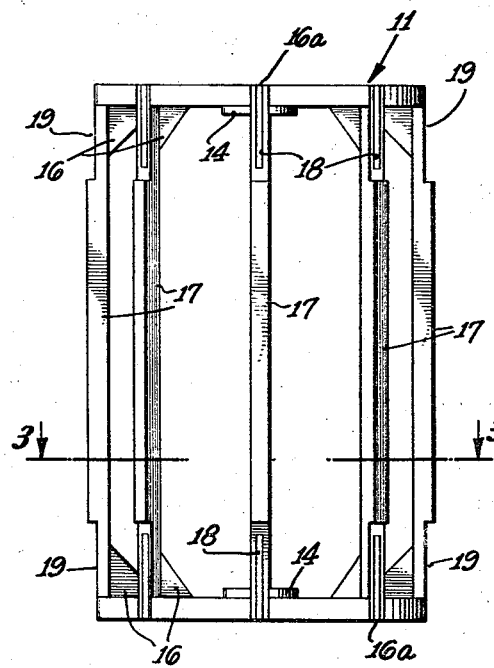
Fig. 2 is a side elevation, partly perspective, of the supporting frame as a whole, and showing angle-bracing members between the radial and longitudinal members of the frame.
Figure 4:
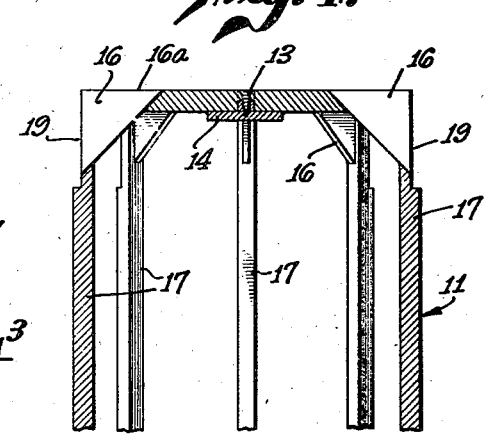
Fig. 4 is a partial section of the upper part of the frame on line 4—4 of Fig. 1, and in the direction of the arrows.

12 indicates each of a plurality of (Figs. 1 through 4) diametrically disposed strips of wood, four of each comprising the assemblage for each end of frame 11, each member 12 being rectangular in cross section, except for a rounding of its outer surface to contact closely with walls of the cylindrical shell. Each set of four of said strips 12 intersect each other at their longitudinal centers, thus providing, for each end set, eight radial members forming the ends of the frame 11, which are designed to reinforce, respectively, corresponding heads of the drum. At intersection screw 13 members 12 comprising each end set are mortised each to the other; so that drum-head contacting surfaces of members of each set will occupy the same plane, each square with the axis of the drum. Said intersecting frame members 12 are further secured in such intersected mortised relation by any suitable adhesive well known in the art, such as glue, as well as by screw 13 which extends through each of them and into circular (wooden) strengthening plate 14 (Figs. 1 and 4). Each of said diametric frame members 12 is slotted at each end to provide mortises 15 for reception of wooden angle brackets 16, one edge of each of which members 16, as shown most clearly at 16a in Figs. 2, 4 and 6, is firmly secured flush with adjacent outside surfaces of its member 12 in mortise 15 by any suitable means well known in the art, such as screws, nails, wooden pegs, or suitable adhesive, or any combination of such means.

Longitudinal members 17 of frame 11 are strips of wood, rectangular in cross-section except for rounding of outer surfaces to conform to the interior curvature of the cylindrical shell (later to be described) which they are designed to reinforce; and at each of their ends such members 17 are slotted to provide mortises 18 for the reception of corresponding edges of wooden angle brackets 16. Longitudinal frame members 17 are cut away as at 19 (Figs. 1, 3 and 4) to receive hoops or bands 20, later to be described. Ends of said frame members 17 abut against inner sides of outer ends of diametrically disposed frame members 12. Wooden angle bracing members 16 extend beyond the ends of longitudinal frame members 17 and into mortises 15 of members 12, into which they are secured as hereinbefore described.

Longitudinal frame members 17 are further secured to diametric frame members 12 and angle brackets 16 by comparatively broad hoops or bands 20 of laminated wood fitted to fill the cut-away portion 19 adjacent each of the ends of members 17, outer surfaces of said hoops 20 being flush with the outer edges of said members 17 (Figs. 8 and 9).

Cylindrical shell 21 is fabricated from (as illustrated perspectively in Figs. 5 and 6) four wooden laminations 21a which are pressed tightly together in telescopic relation with each other, a suitable adhesive intervening, and with the seams formed by the respective abutting ends 21b of each lamination out of alignment with each other as indicated in Fig. 5; that is to say, in staggered relation, and, in the completely fabricated plywood cylindrical construction, as shown most clearly in Fig. 6, said abutting ends are equidistantly separated from each other.

Shell 21 is of the length of interior supporting frame 11 plus thicknesses of both circular plywood drumheads 22, and, as assembled, shell 21 encloses and is supported by frame 11 as most clearly shown in Fig. 6. The two drumheads 22 are of such relative dimensions as to permit each to telescope closely into opposite ends of shell 21 with the inside circular flat surface of each of said drumheads 22 abutting against adjoining ends of frame 11 as assembled within said shell; and peripheries of said drumheads 22 are secured to adjoining inside edges of shell 21 and to respective abutting ends of frame 11 by any means well known in the art, such as nails, screws, wooden pegs, glue or any combination thereof. Each of annular plywood rims 23 (Figs. 6 through 10) is of the same outside diameter as shell 21, and each of said rims 23 is secured by any suitable means well known in the art, coincidentally, to the upper marginal periphery of corresponding drumheads 22, and to end edges of shell 21 and to frame 11, thus overlapping the joints between drumheads 22 and the inside of the end of shell 21 and extending the joint forming part of the chime to the outer surface of shell 21.

24 (Figs. 7 through 10) indicates each of the four wooden rolling hoops (the two outer forming part of the chimes) each formed of a series of superimposed wooden laminations adhesively secured in such relation as to constitute what is commonly known as plywood. Two of said rolling hoops 24 encircle opposite ends of shell 21 coincidentally encircling the peripheries of corresponding annular plywood rims 23 (as shown most clearly in cross section in Figs. 9 and 10), thus overlapping the joints between the respective annular rims 23 and the corresponding ends of shell 21 and lengthening and strengthening the head to shell connection known in steel drum construction as the chimes. The remaining two rolling hoops 24 are equidistantly spaced between those heretofore described at the end of the drum.

In Figs. 6 through 10 are shown the placement, and in Figs. 8, 9 and 10, the construction and application of orifice fittings of the drum and their closure plugs. Two of such orifice fittings and corresponding plugs are shown; each, except for relative size, identical in construction and assemblage with other parts and with each other; so that identical indicating numerals may be employed. 25 indicates a metal fitting, interiorly screw-threaded to receive a closure plug 26, which plug is provided with spanner-wrench holds 27. Said fittings 25 also comprise peripherally extending flanges 28, which flanges have holes for screws 29 by which such fittings are secured to drum head 22 and in their respective circular openings through plywood drumhead 22 as clearly shown in Figs. 8 and 9. Joints between orifice fittings 25 and drumhead 22 are made leak-proof by any suitable cement well known in the art.

While, for illustrative purposes, I have shown a construction principally of wood, and the plywood shell 21, rolling hoops 24, drum heads 22, and annular rims 20, respectively, as comprising four laminations, and hoops 20 as of three laminations; and have illustrated details of specific construction and assemblage of orifice fittings and their plugs; and have shown a specific form and assemblage of elements of, and the shape as a whole of, interior supporting frame 11; and have pictured the frame as adapted for the support of a cylindrical shell; it is to be understood that I do not limit myself to such details, as it is obvious that the supporting frame may be given a contour to support the interior surface of a truncated conical shell, that more or less laminations may be employed in the fabrication of the respective parts; that the arrangement, assemblage, form, and number of members comprising parts of the supporting frame, and their precise means of joinder with additional elements may be varied; and that laminations comprising various parts, such as of the shell and its ends, reinforcing members, and rolling hoops, while illustrated and described herein as of wood, may be of the natural product or may be of artificial structure, and also may be of other materials than wood, natural or artificial, of either plastic or fibrous composition or both, and if of fibrous nature, may be of felted or textile character or a combination of both; and that laminations of such different characteristics, compositions or materials may be combined or alternated in any order with those of any other character, and that reinforcing members of any character may be embodied in or between laminations for any of the parts of my drum container—all without departing from the spirit of my invention as defined in the appended claims.

What I claim and desire to secure by Letters Patent is:

1. In a drum-container, a plurality of long-rectangular shaped frames, each composed of strips of wood, end strips of each of said frames centrally bisecting each other with the respective strip-ends equally spaced apart to form a composite reinforcing frame for the interior walls and ends of said container, a shell, circular in cross-section, of laminated structure surrounding and in close contact with the long equi-spaced strips of said reinforcing frame, and means to secure parts of said reinforcing frame to each other and contacting parts of said frame to said shell.

2. In a drum-container, a plurality of long-rectangular shaped frames, each composed of strips of wood, end strips of each of said frames centrally bisecting each other with the respective strip-ends equally spaced apart to form a composite reinforcing frame for the interior walls and ends of said container, a shell, circular in cross-section, of laminated structure surrounding and in close contact with the long equi-spaced strips of said composite reinforcing frame, drum-heads secured by fluid-tight joinder to opposite ends of said shell, and means to secure parts of said reinforcing-frame to each other and contacting parts of said frame to said shell and drum-heads.

3. In a drum-container, a plurality of long-rectangular shaped frames, each composed of strips of wood, and strips of each of said frames centrally bisecting each other with the respective strip-ends equally spaced apart to form a composite reinforcing frame for the interior walls and ends of said container, a shell, circular in cross-section, of laminated structure surrounding and in close contact with the long equi-spaced strips of said composite reinforcing frame, drum-heads secured by fluid-tight joinder to opposite ends of said shell, annular rims secured by fluid-tight means to said drum-heads and covering the chimes of said container, and means to secure parts of said reinforcing frame to each other and contacting parts of said frame to said shell and drum-heads.

4. In a drum-container, a reinforcing frame composed of strips of wood of equal width and thickness, said supporting frame comprising a plurality of long-rectangular shaped wooden frames of like dimensions, end strips of each of said last-mentioned frames centrally bisecting each other, long strips of said frame being equally spaced apart, a shell, circular in cross-section, of laminated structure surrounding and in close contact with said frame, and means to secure said frame and said shell together.

5. In a device of the character described, a shell, circular in cross-section, having circular drum-heads, a wooden frame for the inner support of said shell and its drum-heads, said frame comprising a plurality of longitudinal members adapted to contact with the inside cylindrical walls of said shell, and a plurality of radial members adapted to contact with the inner walls of said drum-heads, the ends of each of said radial frame members being rigidly secured to corresponding ends of each of said longitudinal members, and means for securing said walls, drum-heads, and frame members, respectively, together.

6. In a drum-container, a supporting frame comprising end sections and means to maintain the spaced relation of said end sections, each of said end sections including a plurality of wooden members radially disposed with respect to the axis of said supporting frame, means to secure the outer ends of said radially disposed members in equi-spaced relation, a shell encircling said frame and supported thereby, and drum-heads supported by and connected to opposite end sections, respectively, of said supporting frame.

JOHN J. SCHUMACHER.